United States Patent
Imai

(10) Patent No.: US 8,259,330 B2
(45) Date of Patent: Sep. 4, 2012

(54) OUTPUT EFFICIENCY OF PRINTER FORMING IMAGE BY INTERPRETING PDL AND PERFORMING OUTPUT BY USING PRINT ENGINE

(75) Inventor: Hitoshi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 12/433,903

(22) Filed: May 1, 2009

(65) Prior Publication Data

US 2009/0284787 A1 Nov. 19, 2009

(30) Foreign Application Priority Data

May 19, 2008 (JP) ................................. 2008-130636

(51) Int. Cl.
*G06F 15/00* (2006.01)
*G06F 17/00* (2006.01)

(52) U.S. Cl. ...................................... 358/1.15; 715/274

(58) Field of Classification Search .................. 358/1.15
See application file for complete search history.

(56) References Cited

U.S. PATENT DOCUMENTS

2005/0286063 A1* 12/2005 Owen et al. .................. 358/1.13

FOREIGN PATENT DOCUMENTS

JP 2004-288013 10/2004

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A printer according to the present invention receives a PDL via a network. Thereafter, the printer creates metadata by interpreting the received PDL and extracting rendering attribute information used in each page. The printer generates vector data from the PDL. Based on setting information on the printer, the printer generates a display list from the vector data. The generated vector data, display list and metadata are stored in a storage device in the printer in association with each other. Thus, output efficiency is improved.

11 Claims, 17 Drawing Sheets

OUTPUT EFFICIENCY OF PRINTER FORMING IMAGE BY INTERPRETING PDL AND PERFORMING OUTPUT BY USING PRINT ENGINE

BACKGROUND OF THE INVENTION

1. Field of the Invention

The present invention relates to a printer, a control method thereof and a computer-readable medium.

2. Description of the Related Art

There has heretofore been widely used a print system in which a PDL is transmitted from an information device to a printer and then the printer performs print processing by interpreting the PDL. In order to improve output efficiency of the printer in such a print system, there has been used a technique in which the information device previously acquires information on the printer and generates a PDL based on the information (see, for example, Japanese Patent Laid-Open No. 2004-288013). By use of this technique, in the print system including the information device and the printer, the print processing can be performed while maximizing the performance of the printer.

Along with the recent advancement in the performance of the printer, there has been used a technique of converting the PDL or a scanned print job into a format which is capable of being outputted in real time, and storing the converted PDL or the print job in a storage device in the printer. Such a technique allows a user who wishes to print a document to select the print job in the printer so as to perform printing with maximized performance and print speed of the printer.

However, in the conventional techniques described above, when print setting of the printer is changed in a state where the print job has been stored in the printer, there arises a need to perform image processing for the print job from the beginning. This leads to a problem that real-time output of the job stored in the printer cannot be performed.

SUMMARY OF THE INVENTION

In order to achieve the foregoing object, the present invention provides a printer for receiving a print job to print the job on a recording sheet according to a predetermined print setting. The printer comprises means for interpreting a resolution-independent rendering information vector data that is obtained from the print job to generate a resolution-dependent rendering information display list based on the print setting; storage means for storing the vector data in a storage in association with the display list; regeneration means for regenerating, when the print setting is changed, a display list from the stored vector data on the basis of the changed setting information; means for storing the regenerated display list in association with the vector data stored in the storage; and means for interpreting the display list stored in the storage to form an image and converting the image into a visible image to output the visible image onto the recording sheet.

In order to achieve the foregoing object, the present invention provides a method for controlling a method for controlling a printer for receiving a print job to print the job on a recording sheet according to a predetermined print setting. The method comprising the steps of: interpreting a resolution-independent rendering information vector data that is obtained from the print job to generate a resolution-dependent rendering information display list based on the print setting; storing the vector data in a storage in association with the display list; regenerating, when the print setting is changed, a display list from the stored vector data on the basis of the changed setting information; storing the regenerated display list in association with the vector data stored in the storage; and interpreting the display list stored in the storage to form an image and converting the image into a visible image to output the visible image onto the recording sheet.

In order to achieve the foregoing object, the present invention provides a computer-readable medium storing a program for allowing a computer to execute a method for controlling a printer for receiving a print job to print the job on a recording sheet according to a predetermined print setting. The method comprising the steps of: interpreting a resolution-independent rendering information vector data that is obtained from the print job to generate a resolution-dependent rendering information display list based on the print setting; storing the vector data in a storage in association with the display list; regenerating, when the print setting is changed, a display list from the stored vector data on the basis of the changed setting information; storing the regenerated display list in association with the vector data stored in the storage; and interpreting the display list stored in the storage to form an image and converting the image into a visible image to output the visible image onto the recording sheet.

The present invention enables updating a display list of print jobs stored in the printer when print setting of the printer is changed, and thus can achieve real-time output even when printing is executed by a user after the setting of the printer is changed.

Further features of the present invention will become apparent from the following description of exemplary embodiments (with reference to the attached drawings).

DETAILED DESCRIPTION OF THE EMBODIMENTS (Embodiment 1)
<Configuration of Printer>

Figure 1:
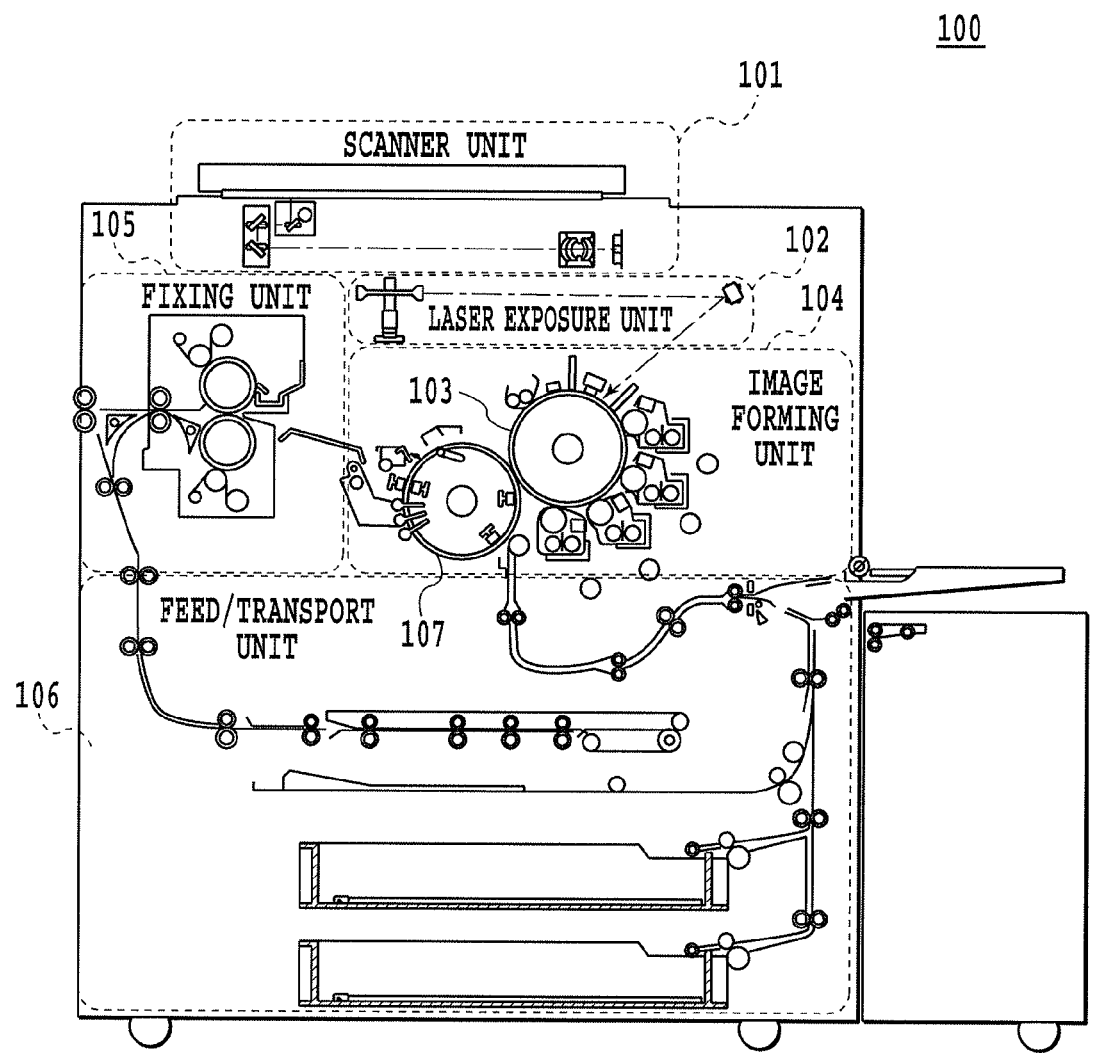
FIG. 1 is a sectional side view showing a structure of a printer (MFP) according to Embodiment 1 of the present invention.

With reference to FIG. 1, description will be given of a configuration of a 1D (drum) color MFP suitable for application of this embodiment.

A 1D color MFP 100 includes a scanner unit 101, a laser exposure unit 102, a photosensitive drum 103, an image forming unit 104, a fixing unit 105, a feed/transport unit 106 and a printer controller (not shown) for controlling those described above.

The scanner unit 101 is used in a step of optically reading a manuscript image by illuminating a manuscript placed on a platen and then creating image data by converting the image into an electric signal.

The laser exposure unit 102 allows a light beam such as a laser beam modulated according to the image data to enter a rotary polygon mirror, which is rotated at a constant angular speed, and irradiates the photosensitive drum 103 with the light beam as reflective scanning light.

The image forming unit 104 rotatably drives the photosensitive drum 103, and charges the drum by use of a charger. The image forming unit 104 develops a latent image with a toner, the latent image being formed on the photosensitive drum 103 by the laser exposure unit 102, and transfers the developed toner image onto a sheet. Thereafter, a minute amount of toner left on the photosensitive drum 103 without having been transferred is recovered. By executing such a series of electrophotographic processes in the image forming unit 104, an image is formed. During four rotations of the sheet wound around at a predetermined position of a transfer belt, development units (development stations) having magenta (M), cyan (C), yellow (Y) and black (K) toners, respectively, repeat the above electrophotographic processes in turn. After the four rotations, the sheet on which a full-color toner image of four colors is transferred leaves a transfer drum 107, and is transported to the fixing unit 105.

The fixing unit 105 includes a combination of rollers and belts. The fixing unit 105 incorporates a heat source such as a halogen heater so that the toner on the sheet on which the toner image is transferred by the image forming unit 104 is melt and fixed by heat and pressure.

The feed/transport unit 106 has one or more sheet storage typified by a sheet cassette and a paper deck. The feed/transport unit 106 separately transports one of a plurality of sheets stored in the sheet storage to the image forming unit 104, and then to the fixing unit 105 in accordance with an instruction from the printer controller. The sheet is wound around the transfer drum 107 in the image forming unit 104 and is transported to the fixing unit 105 after four rotations. During the four rotations, toner images of the respective colors, Y, M, C and K are transferred onto the sheet. Moreover, in the case of forming images on both sides of the sheet, the sheet that has passed through the fixing unit 105 is controlled to be transported to the image forming unit 104 again through a transport path.

The printer controller communicates with a MFP controller for controlling the entire MFP 100, and executes control in response to an instruction from the MFP controller. Moreover, the printer controller sends out an instruction so as to realize harmonious smooth operations as a whole while managing states of the respective units described above, including the scanner unit, the laser exposure unit, the image forming unit, the fixing unit and the feed/transfer unit.

<System Configuration>

Figure 2:
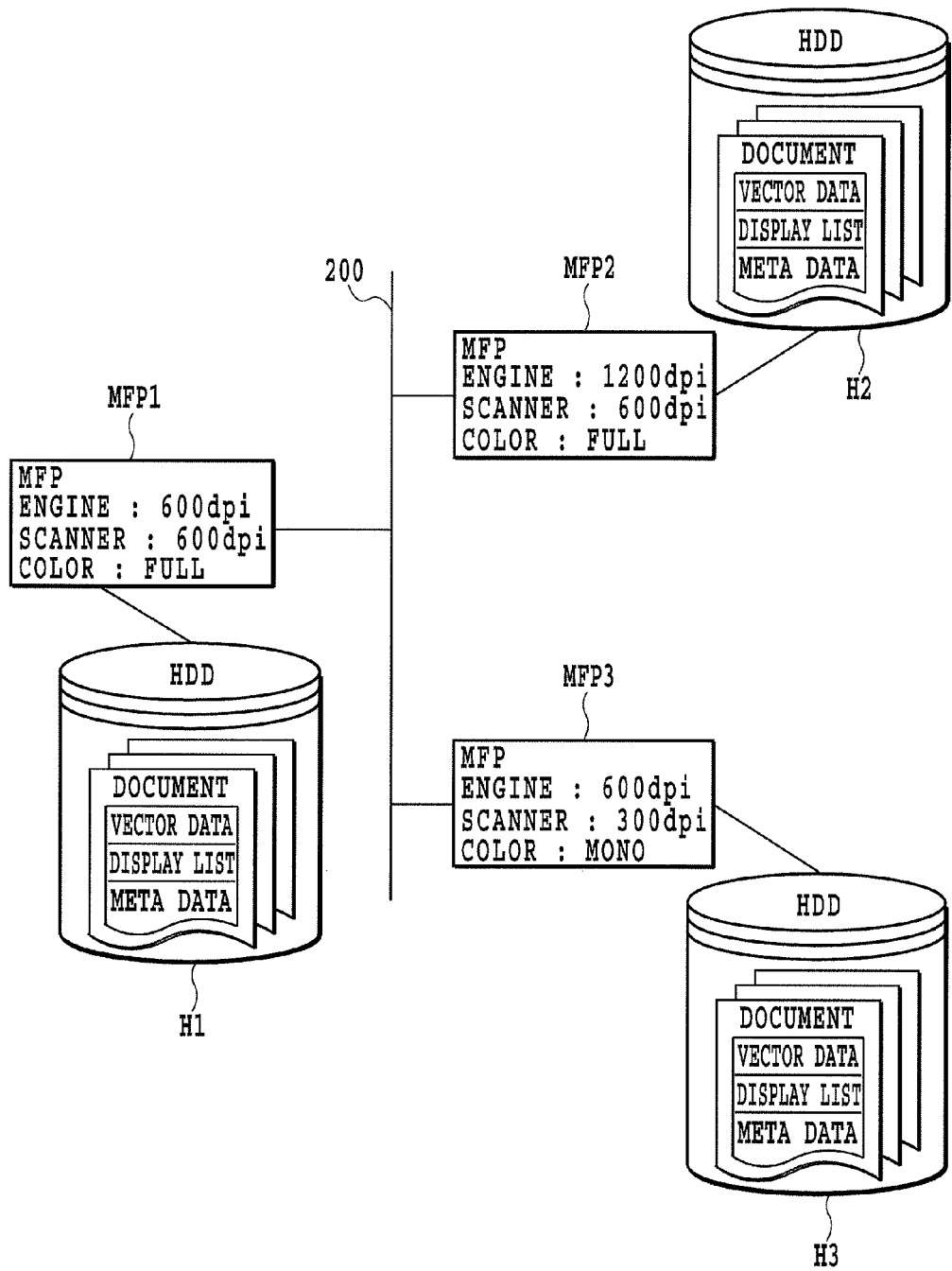
FIG. 2 is a block diagram showing an example of a system configuration according to Embodiment 1.

FIG. 2 is a block diagram showing an entire configuration of an image processing system including MFPs which are printers according to this embodiment. In FIG. 2, the image processing system includes MFP1, MFP2 and MFP3, which are connected to each other through a Local Area Network (LAN) 200 or the like.

The MFPs include Hard Disk Drives (HDDs: secondary storage devices) H1, H2 and H3, respectively. MFP1, MFP2 and MFP3 can communicate with each other by use of a network protocol. Note that the MFPs connected through the LAN 200 do not have to be limited to physical arrangement as described above. Moreover, devices (for example, PCs, various servers, printers and the like) other than the MFPs may be connected to the LAN 200.

<Configuration of Controller Unit>

Figure 3:
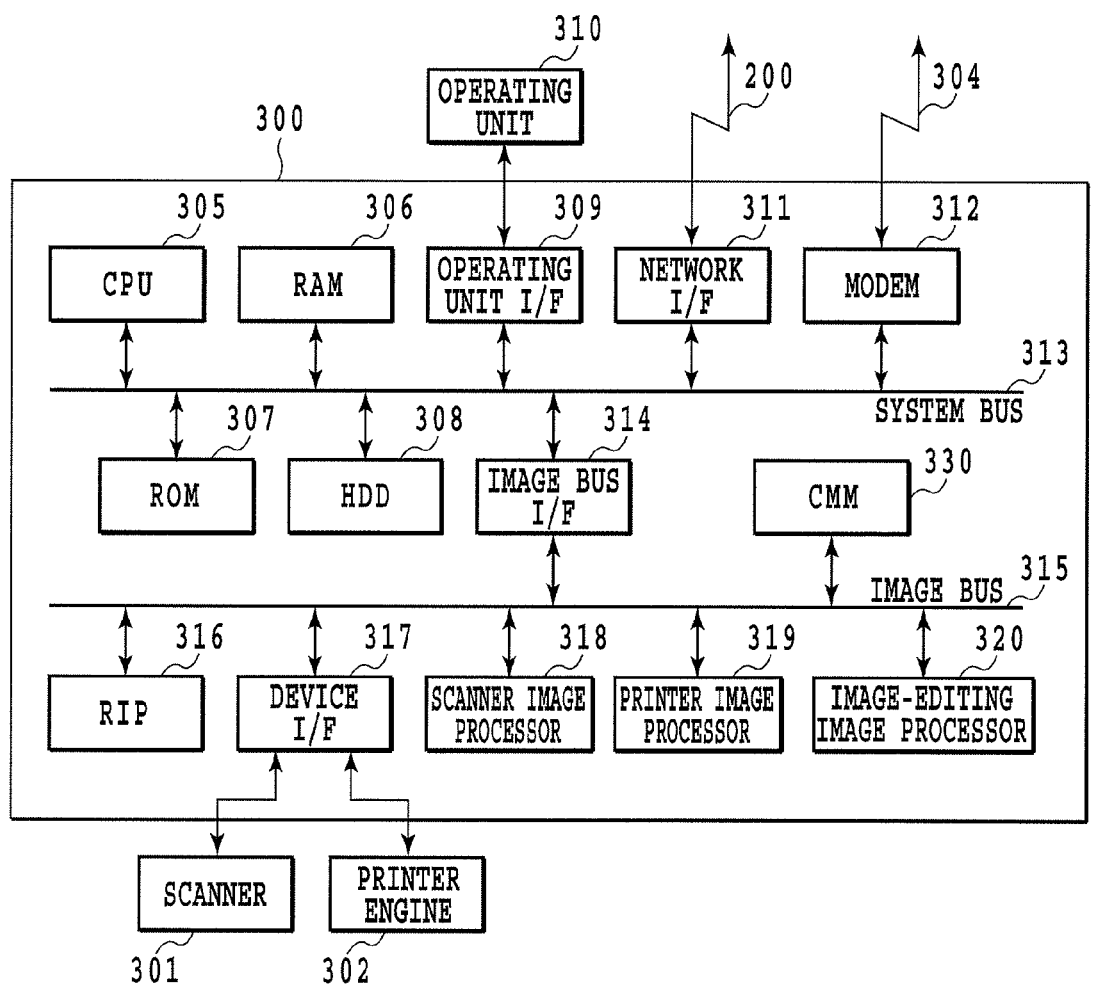
FIG. 3 is a diagram showing a configuration example of a control unit in each device according to Embodiment 1.

FIG. 3 is a block diagram showing a configuration example of a control unit (controller) in the MFP according to this embodiment. In FIG. 3, a controller 300 is connected to a scanner 301 that is an image input device and a printer engine 302 that is an image output device, and performs control for reading image data and for print output. Moreover, the controller 300 is connected to the LAN 200 and a public line 304 to perform control for inputting and outputting image information and device information through a network.

A CPU 305 is a central processing unit for controlling the entire MFP. A RAM 306 is a system work memory for the operation of the CPU 305 and is also an image memory for temporarily storing inputted image data. Furthermore, a ROM 307 is a boot ROM and stores a system boot program. A HDD 308 is a hard disk drive and stores system software for various processing, the inputted image data and the like. An operation unit I/F 309 is an interface for an operation unit 310 having a display screen capable of displaying the image data and the like, and outputs operation screen data to the operation unit 310. In addition, the operation unit I/F 309 serves to transmit information inputted by a user from the operation unit 310 to the CPU 305. A network interface 311 is achieved by, for example, a LAN card or the like, and is connected to the LAN 200 to input and output information from and to an external apparatus. Furthermore, a modem 312 is connected to the public line 304 and exchanges information with an external apparatus. The units described above are arranged to be in connection with a system bus 313.

An image bus I/F 314 is an interface for connecting the system bus 313 and an image bus 315 that transfers image data at high speed, and is also a bus bridge for converting a data structure. A raster image processor (RIP) 316, a device I/F 317, a scanner image processor 318, a printer image processor 319, an image-editing image processor 320 and a color management module (CMM) 330 are connected to the image bus 315.

The RIP 316 rasterizes a page description language (PDL) code and vector data described later into an image. The device I/F 317 connects the scanner 301 and the printer engine 302 to the controller 300, and performs synchronous/asynchronous conversion of image data.

Moreover, the scanner image processor 318 performs various kinds of processing such as correction, modification and editing of image data inputted from the scanner 301. The printer image processor 319 performs processing such as correction and resolution conversion according to the printer engine of image data to be printed out. The image-editing image processor 320 performs various kinds of image processing such as rotation and compression/decompression of image data. The CMM 330 is a dedicated hardware module which applies color conversion processing (also called color space conversion processing) to image data on the basis of a profile and calibration data. The profile is information such as a function for converting color image data expressed on a device-dependent color space into a device-independent color space (for example, Lab or the like). The calibration data is data for correcting color reproduction characteristics of the scanner 301 and the printer engine 302 in the color MFP.

<Controller Software Configuration>

Figure 4:
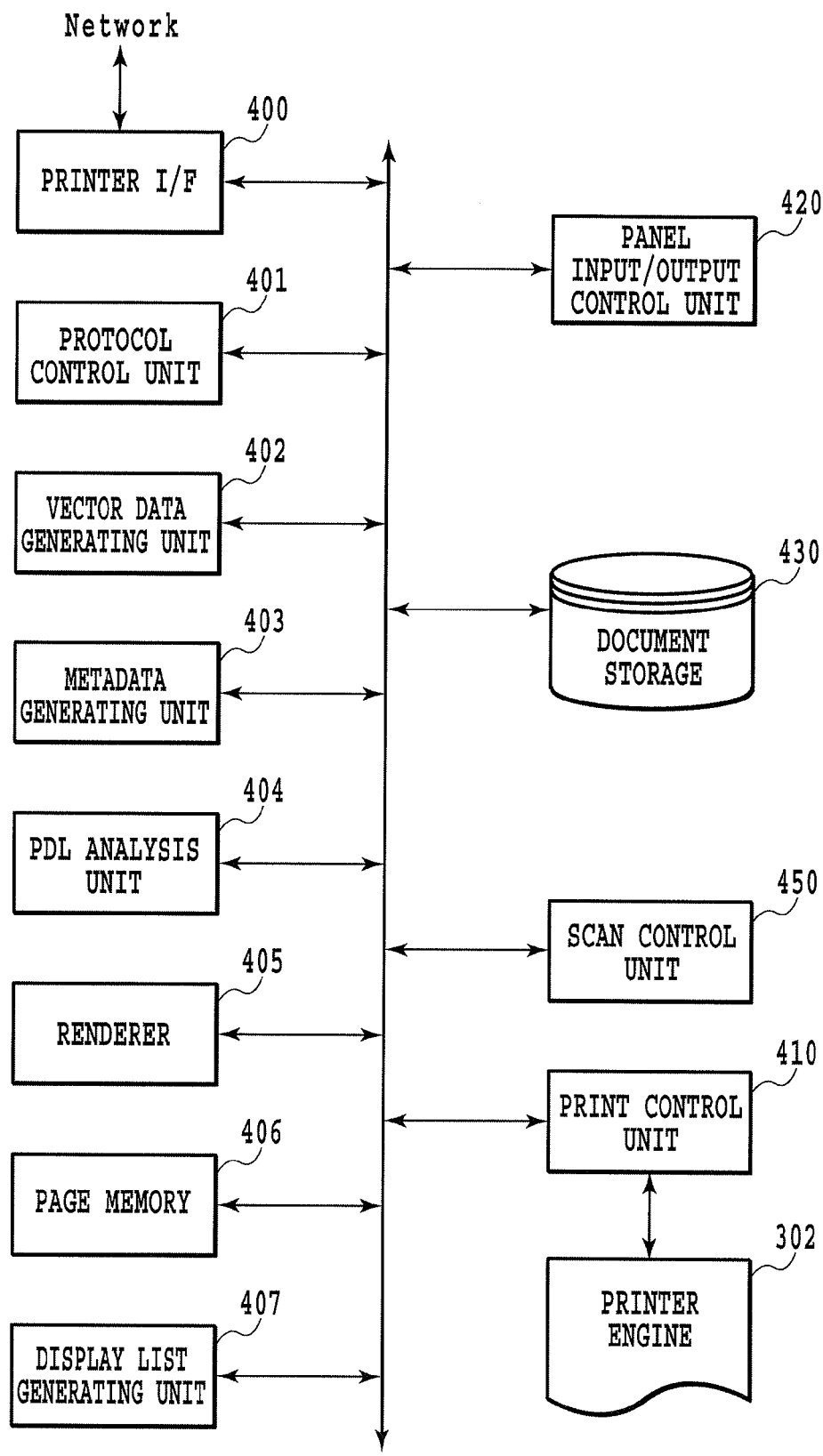
FIG. 4 is a block diagram showing an example of a controller software configuration according to Embodiment 1.

FIG. 4 is a block diagram showing a configuration of controller software for controlling operations of the MFP.

A printer I/F 400 and a protocol control unit 401 are processors constituting the network I/F 311 and the modem 312 shown in FIG. 3. A vector data generating unit 402, a metadata generating unit 403, a PDL analysis unit 404, a renderer 405 and a display list generating unit 407 are processors constituting the RIP 316 shown in FIG. 3. A certain region of the RAM 306 shown in FIG. 3 is assigned to a page memory 406 and, when there arises a case where the RAM 306 has no more room, a certain region of the HDD 308 shown in FIG. 3 may be assigned thereto. A panel input/output control unit 420 is a processor constituting the operating unit I/F 309 shown in FIG. 3. A certain region of the HDD 308 shown in FIG. 3 is assigned to a document storage unit 430. A scan control unit 450 is a processor constituting the device I/F 317, the scanner image processor 318 and the image-editing image processor 320 shown in FIG. 3. A print control unit 410 is a processor constituting the device I/F 317, the printer image processor 319 and the CMM 330 shown in FIG. 3.

The protocol control unit 401 communicates with the outside by analyzing and transmitting network protocols. The printer interface 400 controls input and output from and to the outside.

The PDL analysis unit 404 analyzes the PDL and transfers an analysis result to the vector data generating unit 402. The scan control unit 450 performs various kinds of processing such as correction, modification and editing of the image data inputted from the scanner, and transfers the processed image data to the vector data generating unit 402. The vector data generating unit 402 converts the inputted data into vector data that is a common processing data format used by the image processing controller regardless of the model of the printer. The vector data is resolution-independent information. The metadata generating unit 403 generates secondary information obtained during the vector data generation processing as metadata. The metadata is additional data not required for rendering processing, and is used to achieve advanced handling of jobs such as enhancement of management efficiency for search and jobs.

The vector data generated by the vector data generating unit 402 is transmitted to the display list generating unit 407. The display list generating unit 407 generates a display list (resolution-dependent rendering information) which is dependent on the output resolution, on the basis of the received vector data. Upon receipt of a print instruction from the user, the renderer 405 converts the display list into a data format (for example, a bit map) that can be immediately printed out by a printer engine 302. The converted bit map data is sequentially rendered in the page memory 406. The page memory 406 is a volatile memory temporarily storing the bit map data converted by the renderer.

The print control unit 410 converts the contents of the page memory 406 into a video signal, and transfers the image converted into the video signal to the printer engine 302. The printer engine 302 is a print mechanism unit for converting the received video signal into a permanently visible image on a recording sheet.

The converting processing in the renderer 405 is faster than throughput of the printer engine. Thus, the user can always enjoy fast print processing as long as the display list is stored in the device.

The panel input/output control unit 420 controls input and output to and from a control panel.

The document storage unit 430 is achieved by a secondary storage device such as a hard disk, and stores data files for each set (job) of input documents, each data file including vector data, a display list and metadata. It is noted that such a data file will be referred to as a "document."

<Document Data Structure>

Next, a structure of a document will be described.

Figure 5:
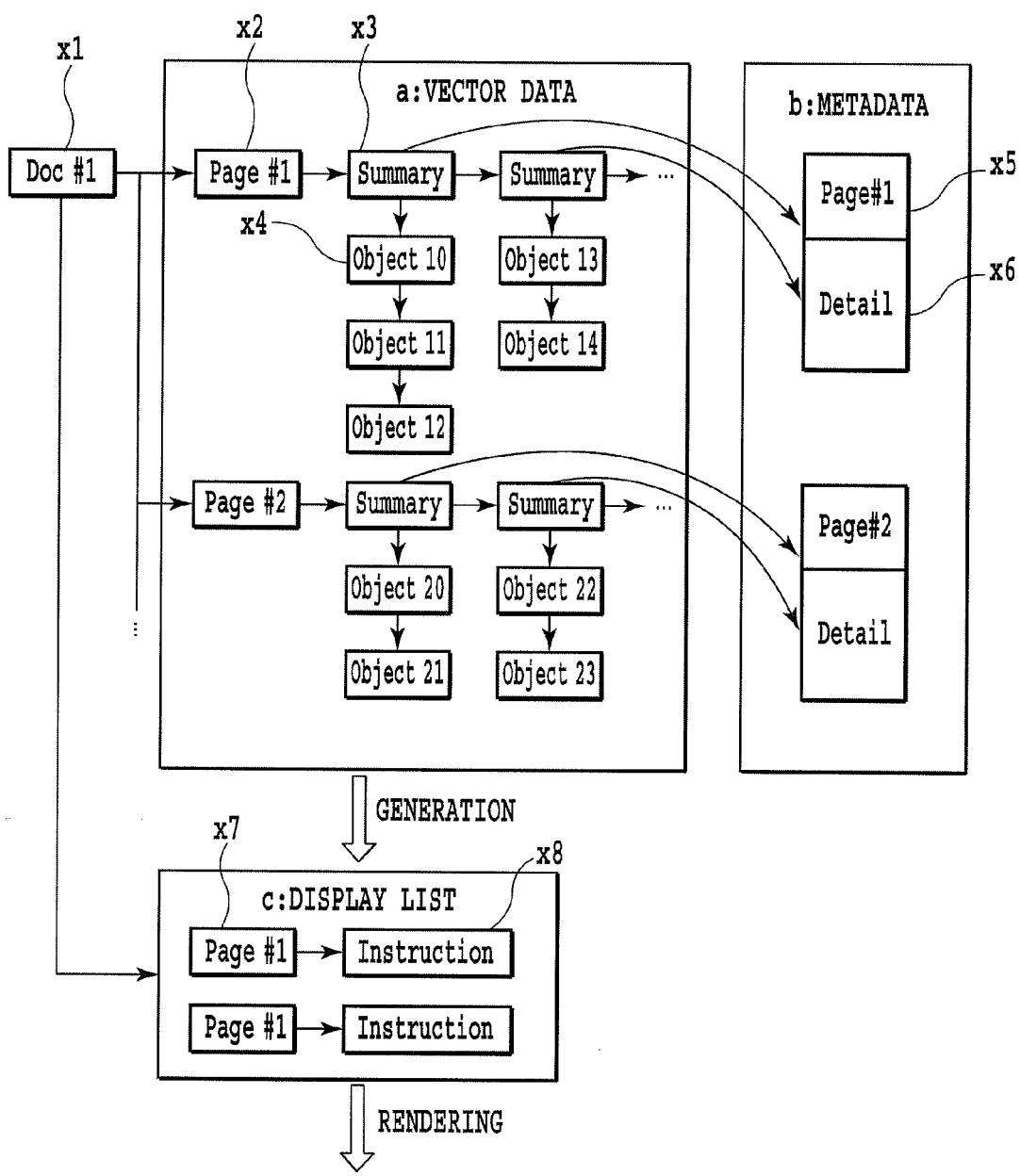
FIG. 5 is a diagram showing a document data structure according to Embodiment 1.

FIG. 5 shows a document data structure.

A document is data composed of multiple pages, and is broadly divided into vector data (a), metadata (b) and a display list (c). The document has a hierarchical structure including a document header (x1) at the beginning. The vector data (a) further includes a page header (x2), summary information (x3) and an object (x5). The metadata (b) further includes page information (x5) and detailed information (x6) The display list (c) further includes a page header (x7) and an instruction (x8) for rendering and converting. In the document header (x1), a vector data storage location and a display list (DL) storage location are described. The vector data and the DL are associated with each other by the document header (x1).

The vector data (a) is resolution-independent rendering data. Thus, in the page header (x2), layout information such as a size and an orientation of a page are described. Moreover, a page header of a different page as a logical page can be associated with the page header (x2). Pieces of rendering data, such as a line, a polygon and a Bezier curve, are linked to the objects (x4), respectively. Multiple objects are collectively associated with the summary information (x3). In the summary information (x3), characteristics of the multiple objects are summarized.

The metadata (b) is additional information for control, which is not related to rendering processing. In the page information (x5) region, page information is described, indicating, for example, whether the metadata is generated from the bit map data or from the PDL data that is a printer control language, and the like. In the detailed information (x6) region, for example, attribute information held by each object in the vector data, character strings (character code strings) generated as OCR information and image information, and the like are described.

Moreover, the metadata (b) is referred to from the summary information (x3) in the vector data (a), and the detailed information (x6) can be found from the summary information (x3).

The display list (c) is an intermediate code used by the renderer to perform bit map conversion. In the page header (x7), a management table of rendering information (instruction) within a page, and the like are described. The instruction (x8) includes resolution-dependent rendering information.

Figure 6A:
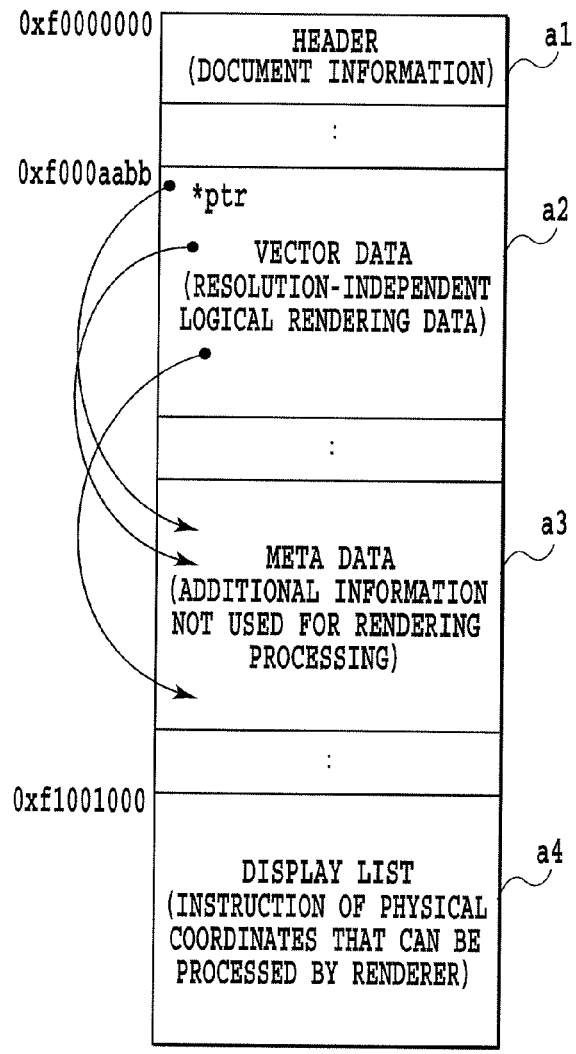
FIGS. 6A and 6B are diagrams showing a document storage structure according to Embodiment 1.
Figure 6B:
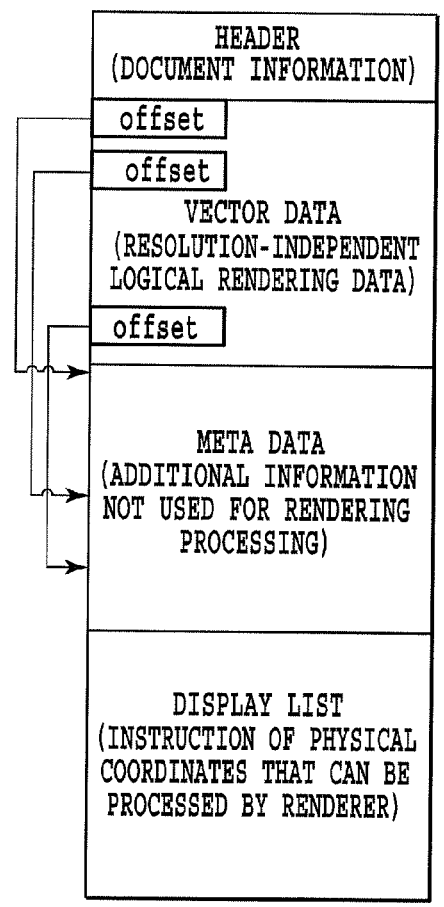

FIGS. 6A and 6B are drawings showing how the data structure described with reference to FIG. 5 is arranged in a memory and in a file.

As shown in FIG. 6A, in a document, a vector data region, a metadata region and a display list region are arranged at any addresses in the memory.

As shown in FIG. 6B, in a document, a vector data region, a metadata region and a display list region are serialized in one file.

<Outline of Embodiment 1>

Figure 7:
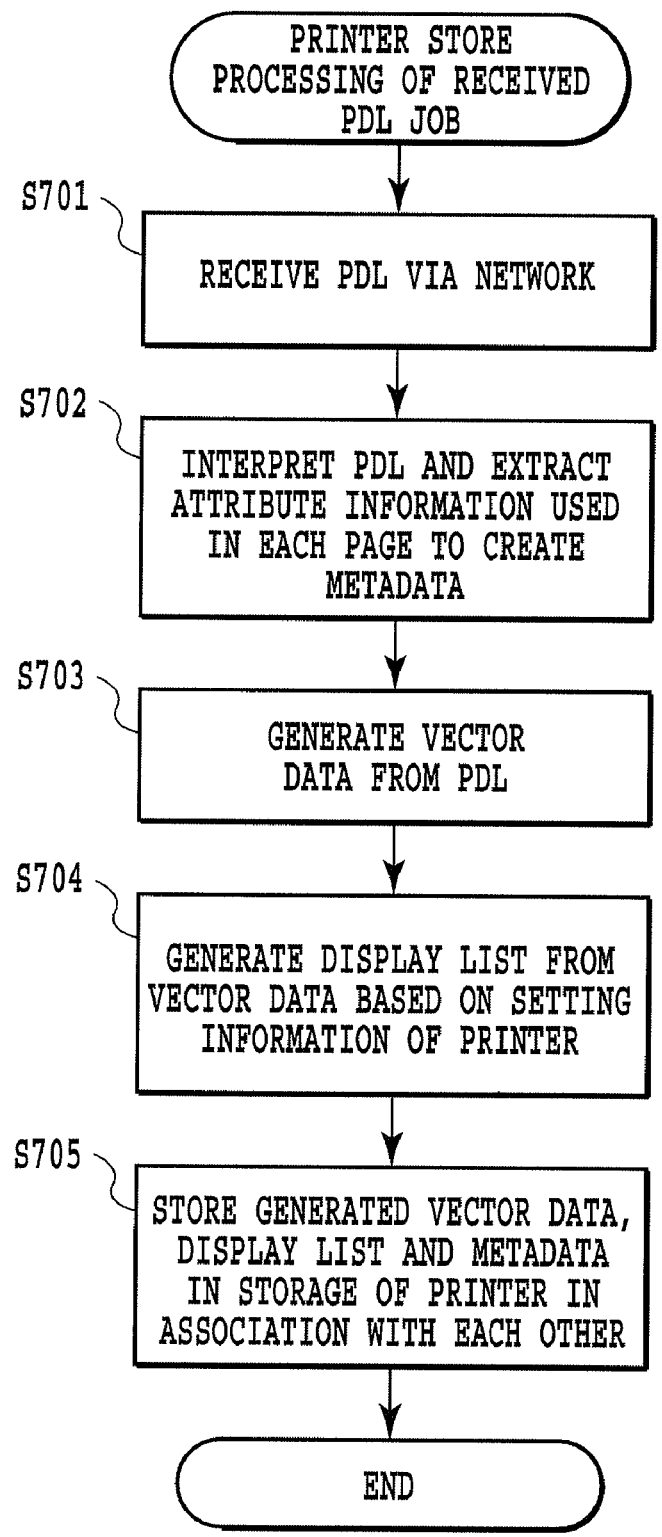
FIG. 7 is a flowchart showing procedures of storage processing where a received PDL job is stored in a storage device in the printer according to Embodiment 1.
Figure 8:
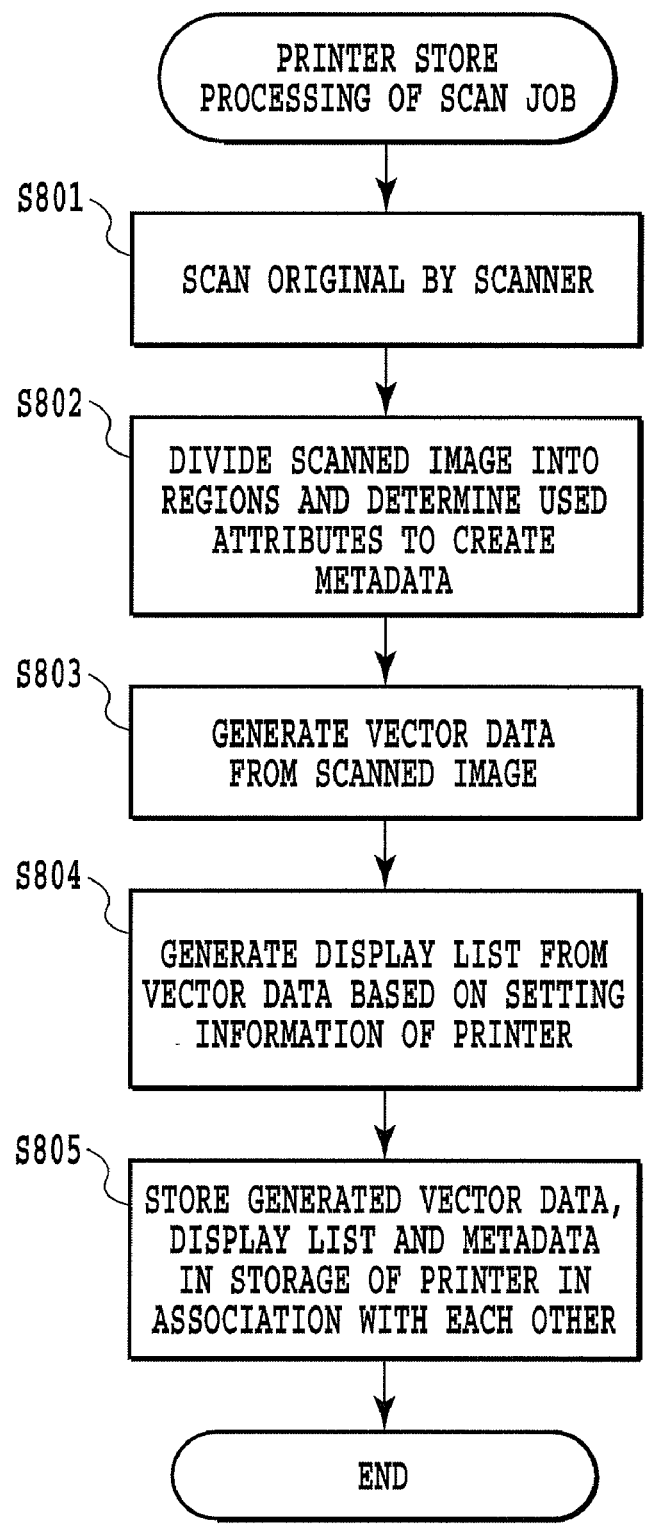
FIG. 8 is a flowchart showing procedures of storage processing where a scan job is stored in the storage device in the printer according to Embodiment 1.
Figure 9:
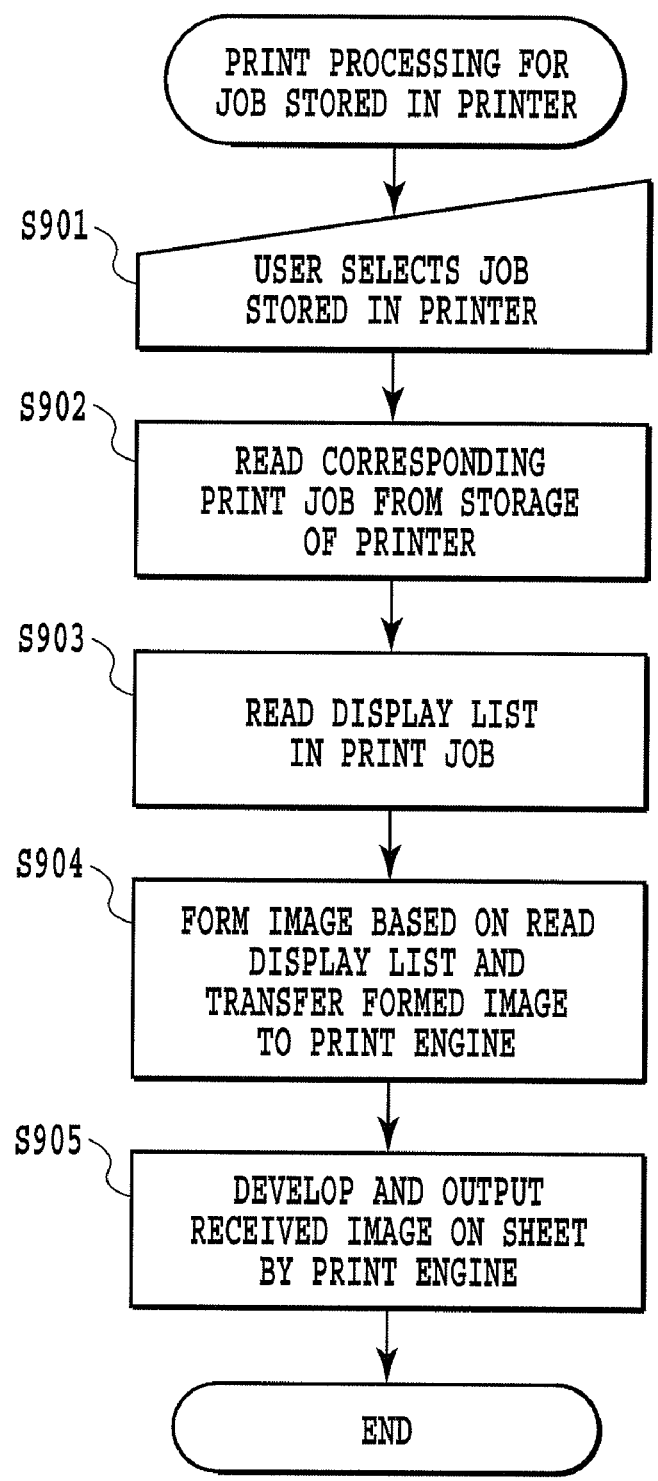
FIG. 9 is a flowchart showing procedures of print processing of a print job held in the storage device in the printer according to Embodiment 1.
Figure 10:
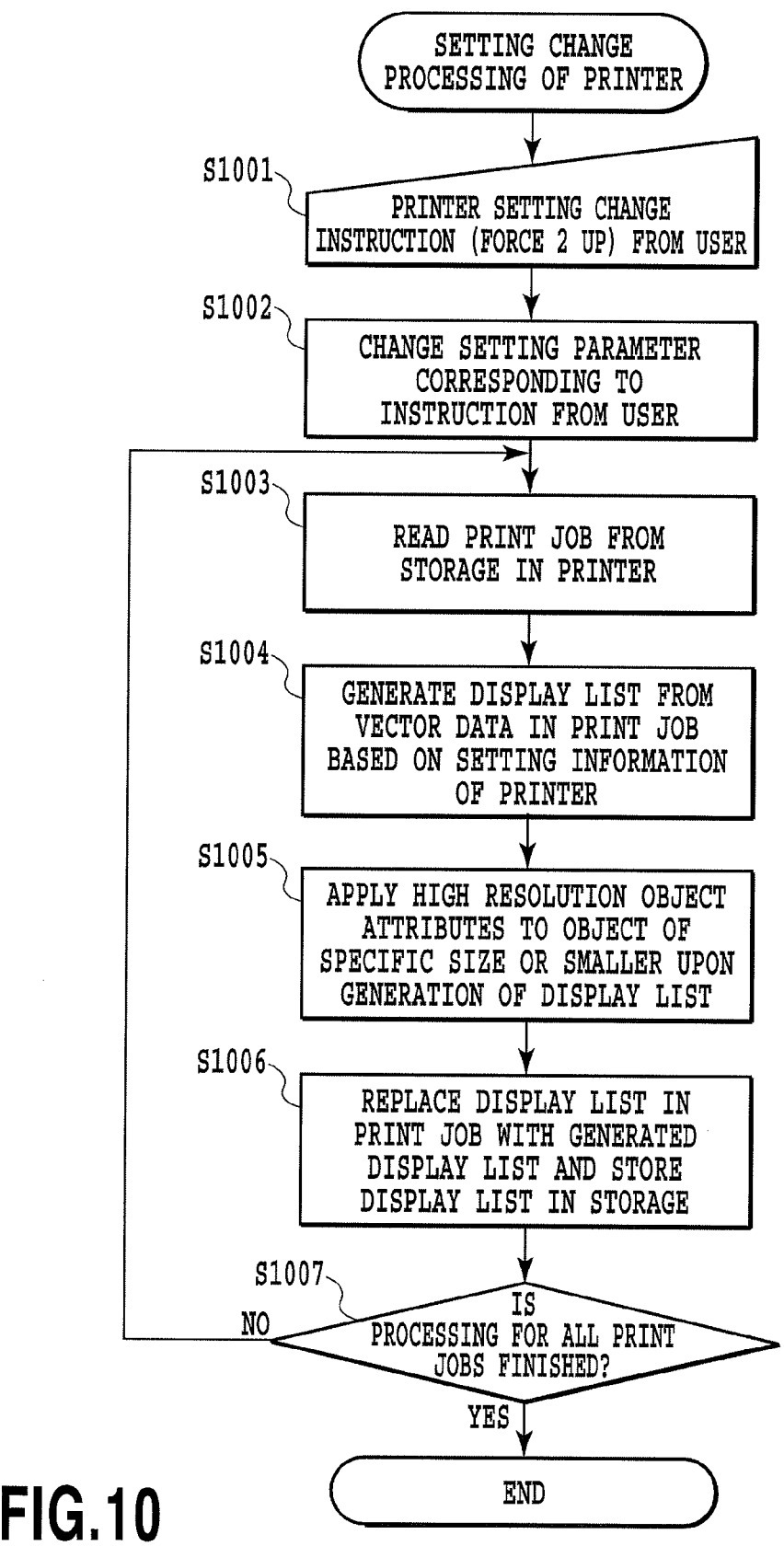
FIG. 10 is a flowchart showing procedures of processing executed by the printer according to Embodiment 1 when print setting of the printer is changed.
Figure 11A:
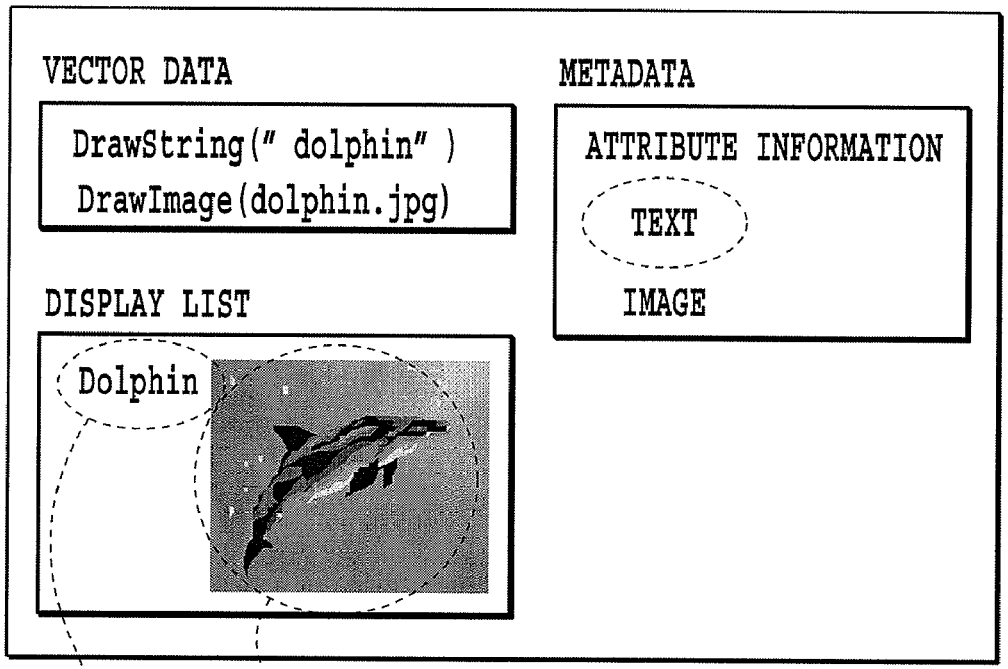
FIG. 11A is a diagram showing an example of a print job to be processed in Embodiment 1.
Figure 11B:
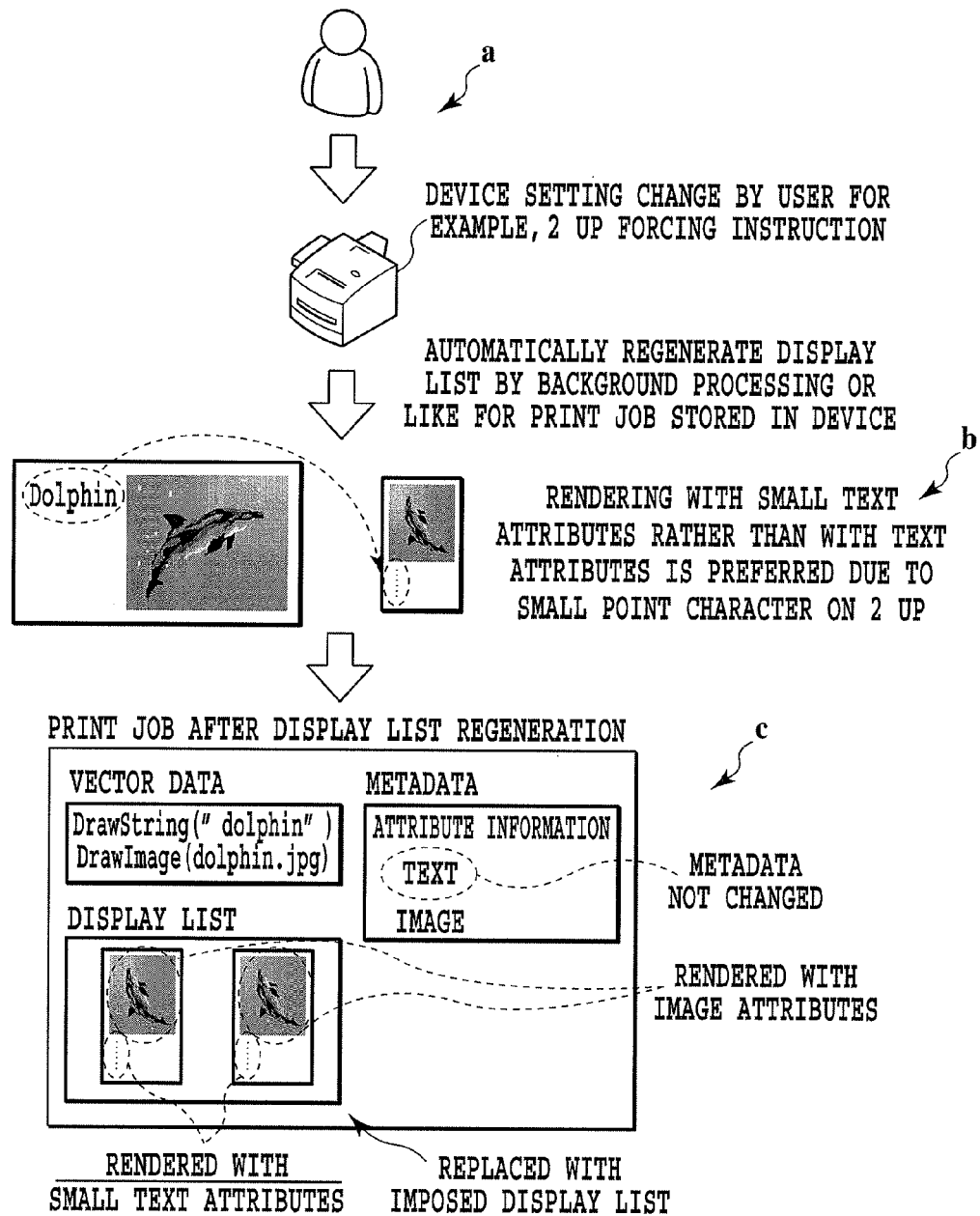
FIG. 11B is a diagram showing an overall processing flow according to Embodiment 1.

With reference to FIGS. 7 to 11A and 11B, an outline of this embodiment will be described. FIG. 7 is a flowchart showing procedures of storage processing where a received PDL job is stored in the document storage unit 430. FIG. 8 is a flowchart showing procedures of storage processing where a scan job is stored in the document storage unit 430. FIG. 9 is a flowchart showing procedures of print processing of a print job stored in the document storage unit 430. FIG. 10 is a flowchart showing procedures of processing executed by the printer when print setting of the printer is changed. FIG. 11A is a diagram showing an example of a print job to be processed in Embodiment 1. FIG. 11B is a diagram showing, in chronological order, a processing flow of the print job shown in FIG. 11A in Embodiment 1.

First, with reference to FIG. 7, description will be given of a storage processing flow where a received PDL job is stored in the document storage unit 430.

In Step 701, the printer receives a PDL via a network. In Step 702, the printer creates metadata by interpreting the received PDL to extract rendering attribute information used in each page. In Step 703, the printer generates vector data from the PDL. In Step 704, the printer generates a display list from the vector data on the basis of setting information on the printer. In Step 705, the printer associates the generated vector data, display list and metadata with each other, and stores them in the document storage unit 430. Thereafter, this processing is terminated.

Next, with reference to FIG. 8, description will be given of a storage processing flow where a scan job is stored in the document storage unit 430.

In Step 801, the printer scans an original by a scanner. In Step 802, the printer determines attributes used in a scanned image and creates metadata by extracting rendering attribute information to be applied. In Step 803, the printer generates vector data from the scanned image. In Step 804, the printer generates a display list from the vector data on the basis of setting information on the printer. In Step 805, the printer associates the generated vector data, display list and metadata with each other, and stores them in the document storage unit 430. Thereafter, this processing is terminated.

Next, with reference to FIG. 9, description will be given of a print processing flow where a print job stored in the document storage unit 430 is printed.

In Step 901, the printer receives selection of a job stored in the storage device in the printer. In Step 902, the printer reads the selected print job from the storage device in the printer. In Step 903, the printer reads a display list in the print job. In Step 904, the printer forms an image on the basis of the read display list, and transmits the formed image to a print engine. In Step 905, the received formed image is developed and outputted onto a sheet by the print engine. Thereafter, this processing is terminated.

Next, with reference to FIG. 10, description will be given of a processing flow executed by the printer when print setting of the printer is changed.

In Step 1001, the printer receives a printer setting change instruction from the user. In Step 1002, the printer changes a corresponding setting parameter according to the instruction specified by the user. In Step 1003, the printer reads a print job from the document storage unit 430. In Step 1004, the printer generates a display list from vector data in the print job on the basis of setting information on the printer.

Subsequently, in Step 1005, the printer applies, in generation of the display list, high resolution rendering attributes to an object of a specific size or smaller. In Step 1006, the printer replaces the display list in the print job with the generated display list, and stores the display list in the document storage unit 430. In Step 1007, the printer determines whether or not the processing is finished for all print jobs. If the processing is not finished, the processing returns to Step 1003 and Steps 1003 to 1007 are repeated. On the other hand, when the printer determines in Step 1007 that the processing for all the print jobs is finished, this processing is terminated.

Next, with reference to FIGS. 11A and 11B, an overall processing flow of this embodiment will be described.

FIG. 11A shows an example of a document data stored in the printer by the store processing shown in FIG. 7 where the received PDL job is stored in the document storage unit 430 or by the store processing shown in FIG. 8 where the scan job is stored in the document storage unit 430. In the document data (print job), the display list generated based on the vector data is stored. In this embodiment, it is assumed that image rendering attributes are applied to a drawing of a dolphin and text rendering attributes are applied to a character string "Dolphin". In the document data (print job), metadata is stored and, in the metadata, rendering attribute information to be used in this print job is stored.

In FIG. 11B, it is assumed that the user operates the printer to designate forced 2 up as indicated by a. In the forced 2 up, all print jobs are always outputted in 2 up (two logical pages are laid out on a physical sheet).

When forced 2 up is designated, as indicated by b in FIG. 11B, a size half the size for original rendering is applied to a data example of this embodiment. In this event, an image of a dolphin has no problem with visibility. However, the character string "Dolphin" is set to a size (for example, 4 pt or the like) with poor visibility. The printer checks a metadata in the print job to determine that the visibility of the character string is poor if the size of the character string is a specific size (for example, 6 pt or the like) or smaller. Therefore, it is determined that the character string "Dolphin" has poor visibility. Accordingly, in the display list generation when forced 2 up is designated, high resolution rendering attributes (for example, small text rendering attributes) are applied to the character string "Dolphin".

An example of a print job is indicated by c in FIG. 11B, in which a display list is regenerated due to the printer setting change processing shown in FIG. 10. This example shows that the small text rendering attributes are applied to the character string "Dolphin" in the display list. However, as to metadata, attribute information remains as text information. This is in order to enable a display list to be generated by use of original rendering attributes when the setting of the device is canceled.

(Embodiment 2)

Figure 12:
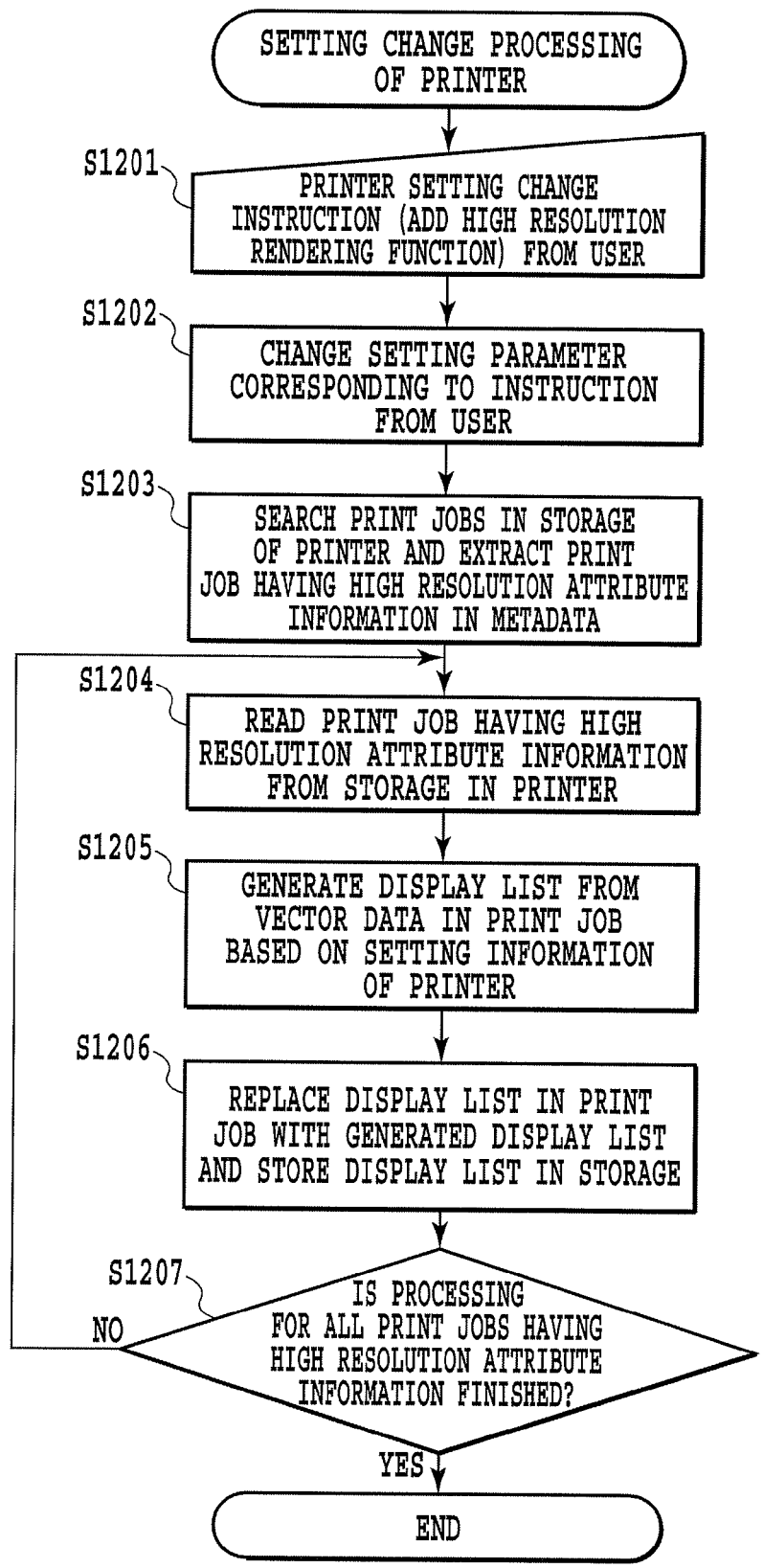
FIG. 12 is a flowchart showing procedures of processing executed by a printer according to Embodiment 2 when print setting of the printer is changed.
Figure 13:
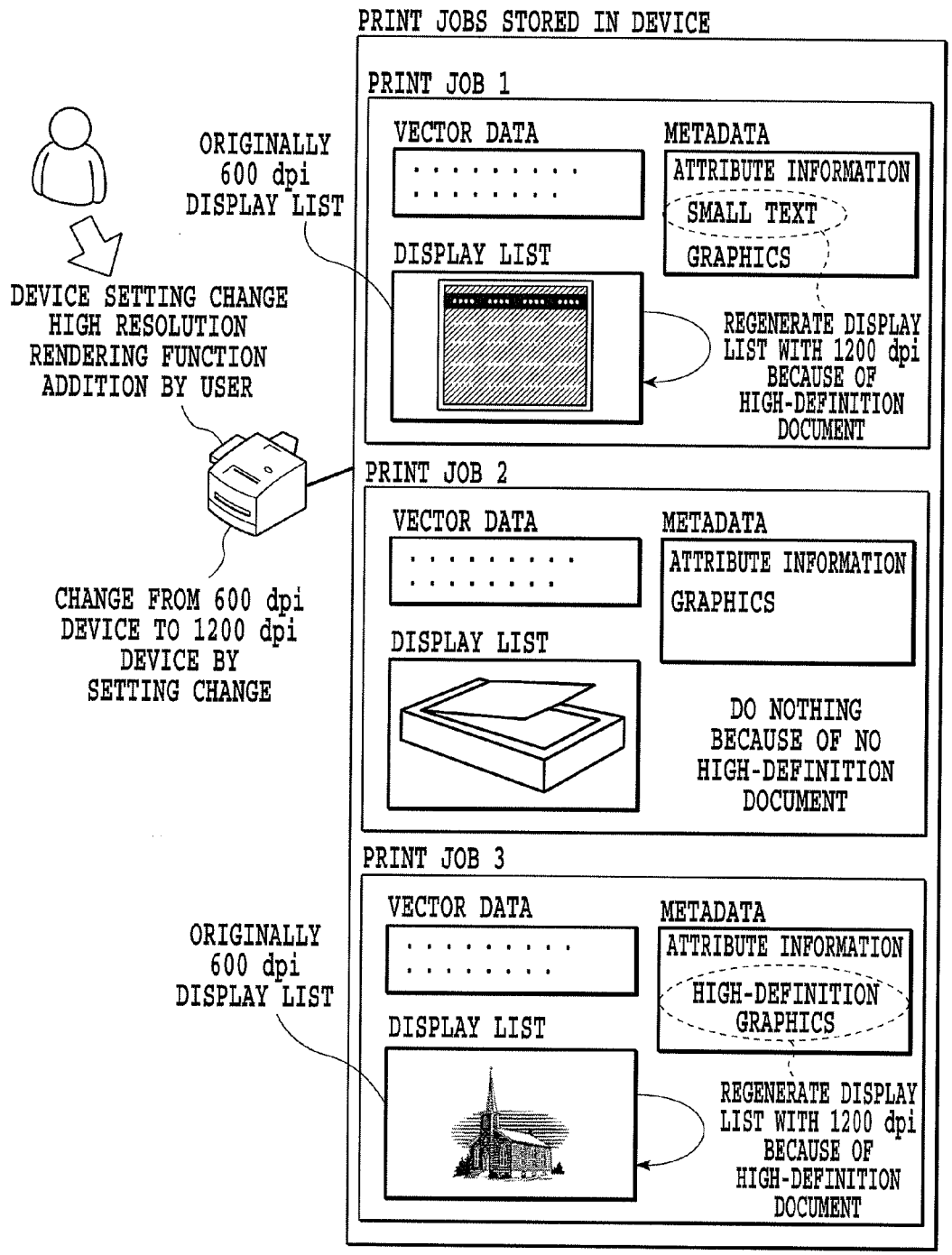
FIG. 13 is a diagram showing an overall processing flow according to Embodiment 2.

With reference to FIGS. 12 and 13, an outline of Embodiment 2 will be described. FIG. 12 is a flowchart showing procedures of processing executed by a printer when print setting of the printer is changed. FIG. 13 is a diagram showing an overall processing flow of this embodiment.

With reference to FIG. 12, description will be given of a processing flow executed by the printer when the print setting of the printer is changed.

In Step 1201, the printer receives a printer setting change instruction from the user. In this embodiment, it is assumed that the user instructs a setting change for adding a high resolution rendering function to the printer in Step 1201 by applying an extended function board to the printer. Thereafter, in Step 1202, the printer changes a corresponding setting parameter according to the instruction specified by the user. In Step 1203, the printer searches through print jobs in a document storage unit 430, and extracts a print job having high resolution rendering attribute information in metadata. In Step 1204, the printer reads the print job having high resolution rendering attribute information from the document storage unit 430.

Subsequently, in Step 1205, the printer generates a display list from vector data in the print job on the basis of setting information on the printer. In Step 1206, the printer replaces the display list in the print job with the generated display list, and stores the display list in the document storage unit 430. In Step 1207, the printer determines whether or not the processing is finished for all print jobs having high resolution rendering attribute information. If the processing is not finished, the processing returns to Step 1204, and Steps 1204 to 1207 are repeated. On the other hand, when the printer determines in Step 1207 that the processing for all the print jobs having high resolution rendering attribute information is finished, this processing is terminated.

Next, with reference to FIG. 13, an overall processing flow of this embodiment will be described.

It is assumed that three print jobs 1 to 3 are originally stored in the printer. The printer originally has an image forming performance of only 600 dpi, and a display list of each print job is set for 600 dpi output. In this state, the user applies the extended function board to the printer to add a 1200 dpi rendering function to the printer. In this event, the printer performs the processing shown in FIG. 12 which is performed when the print setting of the printer is changed. The printer checks if there are high resolution rendering attributes in metadata of the print jobs 1 to 3. As a result, it is found out that there are small text rendering attributes and high-definition graphics rendering attributes which are the high resolution rendering attributes in the print jobs 1 and 3, respectively. Thus, the printer regenerates display lists with 1200 dpi resolution for the print jobs 1 and 3.

(Embodiment 3)

Figure 14:
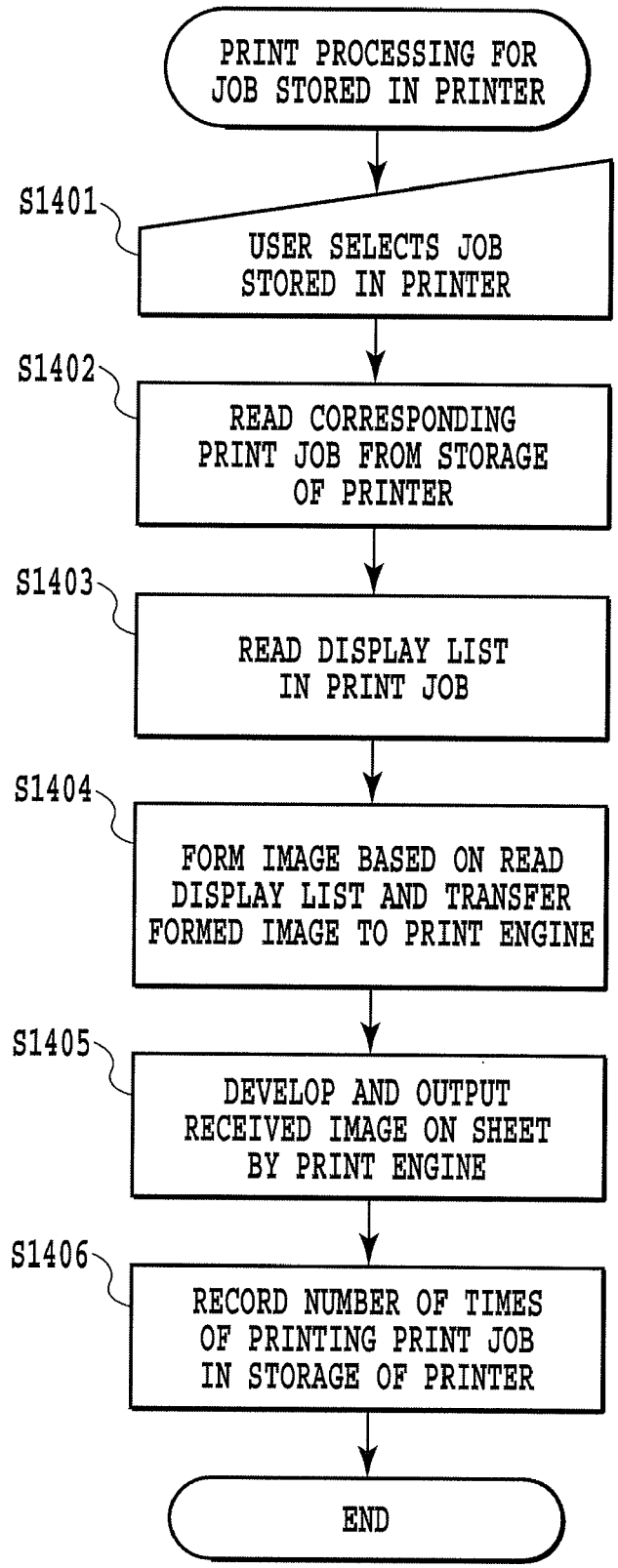
FIG. 14 is a flowchart showing procedures of print processing of a print job held in a storage device in a printer according to Embodiment 3.
Figure 15:
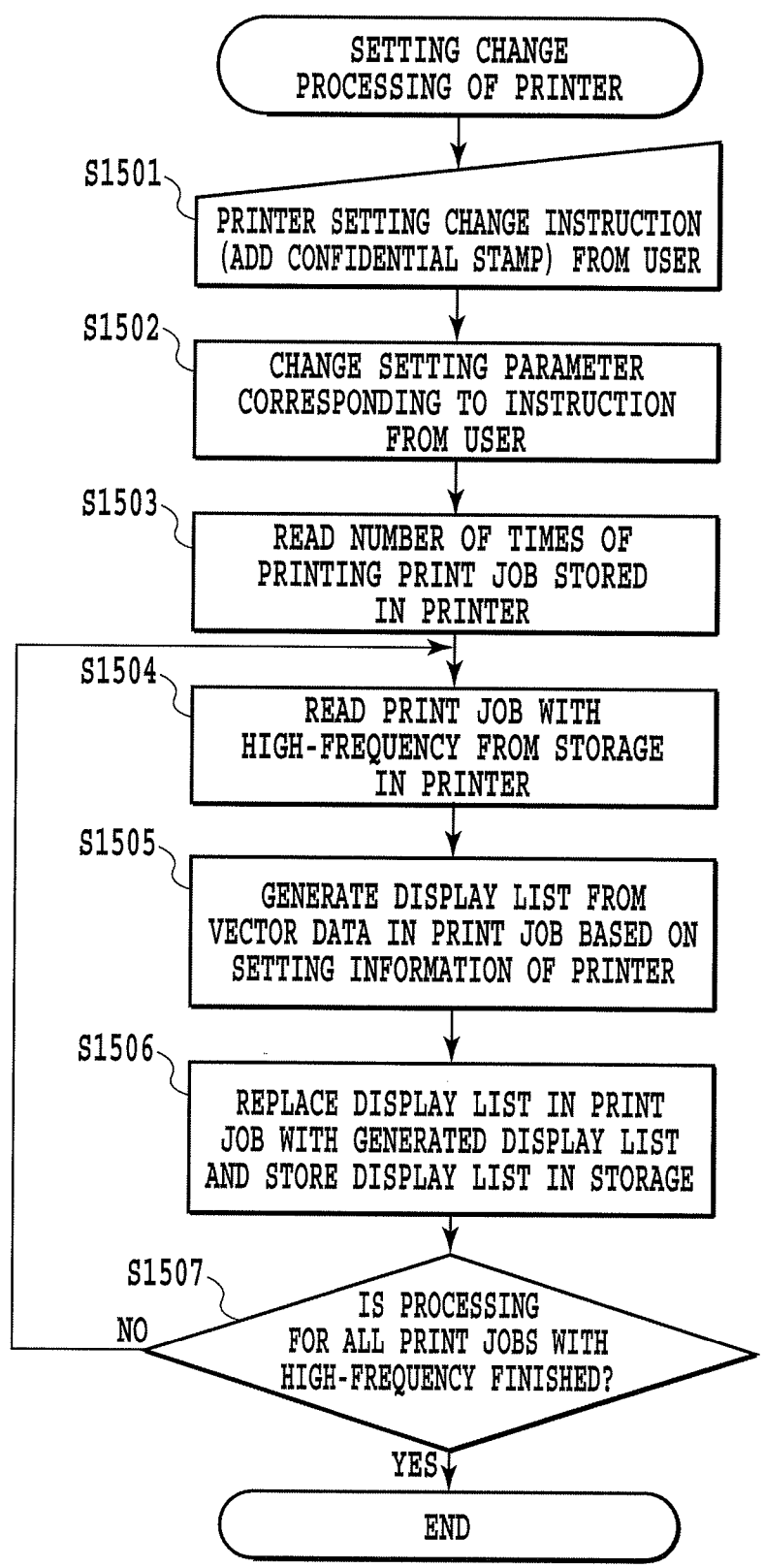
FIG. 15 is a flowchart showing procedures of processing executed by the printer according to Embodiment 3 when print setting of the printer is changed.
Figure 16:
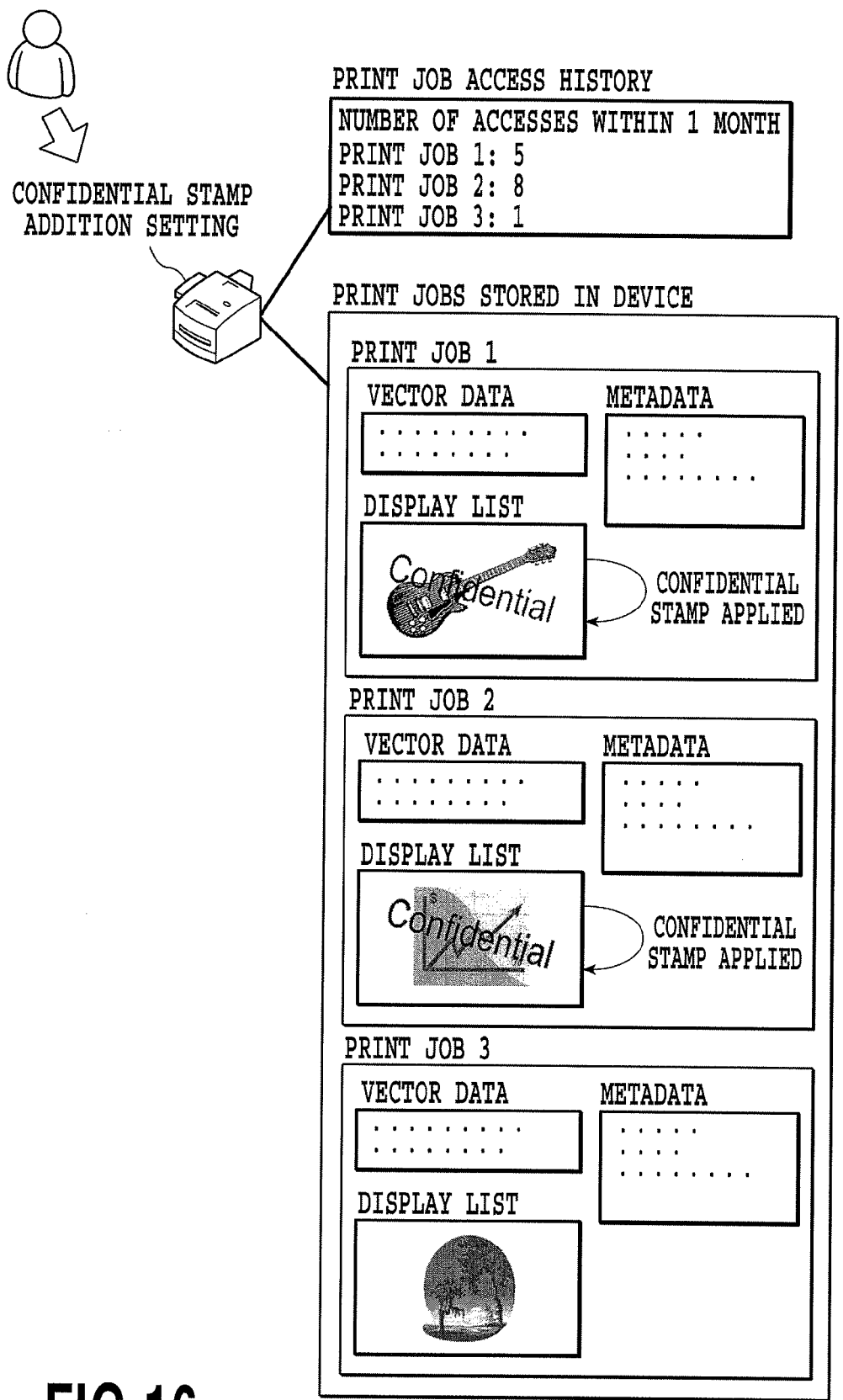
FIG. 16 is a diagram showing an overall processing flow according to Embodiment 3.

With reference to FIGS. 14 to 16, an outline of Embodiment 3 will be described. FIG. 14 is a flowchart showing procedures of print processing of a print job stored in a document storage unit 430. FIG. 15 is a flowchart showing procedures of processing executed by the printer when the print setting of the printer is changed. FIG. 16 is a diagram showing an overall processing flow of this embodiment.

With reference to FIG. 14, description will be given of a flow of print processing of a print job stored in the document storage unit 430.

In Step 1401, the printer receives selection of a job stored in the printer. In Step 1402, the printer reads the selected print job from the document storage unit 430 in the printer. In Step 1403, the printer reads a display list in the print job. In Step 1404, the printer forms an image on the basis of the read display list, and transmits the formed image to a print engine. In Step 1405, the received print is developed and outputted onto a sheet by the print engine. In Step 1406, the number of times of printing the print job is recorded in the document storage unit 430. Thereafter, this processing is terminated.

Next, with reference to FIG. 15, description will be given of a processing flow executed by the printer when print setting of the printer is changed.

In Step 1501, the printer receives a printer setting change instruction from the user. Thereafter, the processing advances to Step 1502. In this embodiment, it is assumed that the print setting of the printer is changed to a Confidential stamp addition setting where "Confidential" display is added to a print document in Step 1501. In Step 1502, the printer changes a corresponding setting parameter according to the instruction specified by the user. Thereafter, the processing advances to Step 1503. In Step 1503, the printer reads print frequency information on each print job stored in the printer. Thereafter, the processing advances to Step 1504. In Step 1504, the printer reads a print job with high print frequency from the document storage unit 430.

Subsequently, in Step 1505, the printer generates a display list from vector data in the print job on the basis of setting information on the printer. Thereafter, the processing advances to Step 1506. In Step 1506, the printer replaces the display list in the print job with the generated display list, and stores the display list in the document storage unit 430. Thereafter, the processing advances to Step 1507. In Step 1507, the printer determines whether or not processing for all print jobs with high print frequency is finished. If the processing is not finished, the processing returns to Step 1504, and Steps 1504 to 1507 are repeated. On the other hand, when the printer determines in Step 1507 that the processing for all the print jobs with high print frequency is finished, this processing is terminated.

Next, with reference to FIG. 16, an overall processing flow of this embodiment will be described.

It is assumed that three print jobs 1 to 3 are originally stored in the printer. Moreover, the printer stores the number of accesses (print executions) within the past month for each print job. Further, the Confidential stamp addition setting is set in the printer by the user. In this event, the printer performs the processing shown in FIG. 15 which is performed when the print setting of the printer is changed. The printer refers to a print job access history in a metadata to search for a print job having a high access frequency (for example, four or more accesses within the past month). As a result, it is found out that the print jobs 1 and 2 have the high access frequency. Thus, the printer preferentially performs, for the print jobs 1 and 2, display list regeneration processing using a Confidential stamp.

(Other Embodiments of the Invention)

As described above, the present invention may be applied to a system including a plurality of devices (for example, a host computer, an interface device, a reader, a printer and the like) or may be applied to an apparatus including one device (for example, a copying machine and a facsimile machine).

Moreover, the scope of the present invention also includes a configuration as a software program code for achieving the functions of the embodiments described above. The software program code is supplied to a computer in an apparatus or a system connected to various devices in order to achieve the functions of the embodiments by operating the various devices. Here, the computer (CPU or MPU) in the system or the apparatus operates the various devices according to stored programs.

Moreover, in this case, the software program code itself achieves the functions of the embodiments described above. Thus, the program code itself and means for providing the computer with the program code, for example, a computer-readable storage medium storing the program code are included in the present invention.

As the storage medium storing the program code, for example, a floppy disk, a hard disk, an optical disk, a magneto-optical disk, a CD-ROM, a magnetic tape, a nonvolatile memory card, a ROM and the like can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130636, filed May 19, 2008, which is hereby incorporated by reference herein in its entirety.

What is claimed is:

1. A printer for receiving a print job to print the job on a recording sheet according to a predetermined print setting, the printer comprising:
   means for interpreting a resolution-independent rendering information vector data that is obtained from the print job to generate a resolution-dependent rendering information display list based on the print setting;
   metadata generation means for generating an additional information metadata for the vector data;
   storage means for storing the vector data in a storage in association with the display list and the metadata;
   regeneration means for regenerating, when the print setting is changed, a display list from the stored vector data on the basis of the changed setting information;
   means for storing the regenerated display list in association with the vector data stored in the storage; and
   means for interpreting the display list stored in the storage to form an image and converting the image into a visible image to output the visible image onto the recording sheet.

2. The printer according to claim 1, further comprising:
   means for generating the vector data, the means interpreting a printer control language PDL to generate the vector data from the interpreted PDL and/or an image information scanned by a scanner,
   wherein said metadata generation means generates the additional information metadata upon vector data generation.

3. The printer according to claim 2, wherein the metadata generation means includes:
   means for extracting a rendering attribute information to which each object belongs from the PDL and/or a rendering attribute information of each object or region which is obtained by performing attribute determination processing on the image information scanned by the scanner; and
   means for recording the extracted rendering attribute information in the metadata.

4. The printer according to claim 1, wherein the regeneration means regenerates the display list for a job having a high access frequency.

5. A printer for receiving a print job to print the job on a recording sheet according to a predetermined print setting, the printer comprising:
   means for interpreting a resolution-independent rendering information vector data that is obtained from the print job to generate a resolution-dependent rendering information display list based on the print setting;
   storage means for storing the vector data in a storage in association with the display list;
   regeneration means for regenerating, when the print setting is changed, a display list from the stored vector data on the basis of the changed setting information;
   means for storing the regenerated display list in association with the vector data stored in the storage; and
   means for interpreting the display list stored in the storage to form an image and converting the image into a visible image to output the visible image onto the recording sheet,
   wherein the regeneration means includes:
   means for searching through metadata on jobs stored in the storage to extract a job including a specific rendering attribute information in the metadata; and
   means for regenerating the display list for the extracted job including the specific rendering attribute information.

6. A method for controlling a printer for receiving a print job to print the job on a recording sheet according to a predetermined print setting, the method comprising the steps of:
   interpreting a resolution-independent rendering information vector data that is obtained from the print job to generate a resolution-dependent rendering information display list based on the print setting;
   generating an additional information metadata for the vector data;
   storing the vector data in a storage in association with the display list and the metadata;
   regenerating, when the print setting is changed, a display list from the stored vector data on the basis of the changed setting information;
   storing the regenerated display list in association with the vector data stored in the storage; and
   interpreting the display list stored in the storage to form an image and converting the image into a visible image to output the visible image onto the recording sheet.

7. The method according to claim 6, further comprising the steps of:
   interpreting a printer control language PDL to generate the vector data from the interpreted PDL and/or an image information scanned by a scanner;
   wherein said generating step generates the additional information metadata upon vector data generation.

8. The method according to claim 7, wherein the metadata generating step includes the steps of:
   extracting a rendering attribute information to which each object belongs from the PDL and/or a rendering attribute information of each object or region which is obtained by performing attribute determination processing on the image information scanned by the scanner; and
   recording the extracted rendering attribute information in the metadata.

9. The method according to claim 6, wherein in the regenerating step, the display list is regenerated for a job having a high access frequency.

10. A method for controlling a printer for receiving a print job to print the job on a recording sheet according to a predetermined print setting, the method comprising the steps of:
    interpreting a resolution-independent rendering information vector data that is obtained from the print job to generate a resolution-dependent rendering information display list based on the print setting;
    generating an additional information metadata for the vector data;
    storing the vector data in a storage in association with the display list and the metadata;
    regenerating, when the print setting is changed, a display list from the stored vector data on the basis of the changed setting information;
    storing the regenerated display list in association with the vector data stored in the storage; and
    interpreting the display list stored in the storage to form an image and converting the image into a visible image to output the visible image onto the recording sheet,
    wherein the regenerating step includes the steps of:
    searching through metadata on jobs stored in the storage to extract a job including a specific rendering attribute information in the metadata; and regenerating the display list for the extracted job including the specific rendering attribute information.

11. A non-transitory computer-readable medium storing a program to execute a method for controlling a printer for receiving a print job to print the job on a recording sheet according to a predetermined print setting, the method comprising the steps of:

interpreting a resolution-independent rendering information vector data that is obtained from the print job to generate a resolution-dependent rendering information display list based on the print setting;

generating an additional information metadata for the vector data;

storing the vector data in a storage in association with the display list and the metadata;

regenerating, when the print setting is changed, a display list from the stored vector data on the basis of the changed setting information;

storing the regenerated display list in association with the vector data stored in the storage; and interpreting the display list stored in the storage to form an image and converting the image into a visible image to output the visible image onto the recording sheet.

* * * * *